J. SCHARL.
PROCESS FOR MAKING ARTICLES OF QUARTZ GLASS.
APPLICATION FILED FEB. 8, 1919.
1,375,657.
Patented Apr. 19, 1921.
2 SHEETS—SHEET 1.
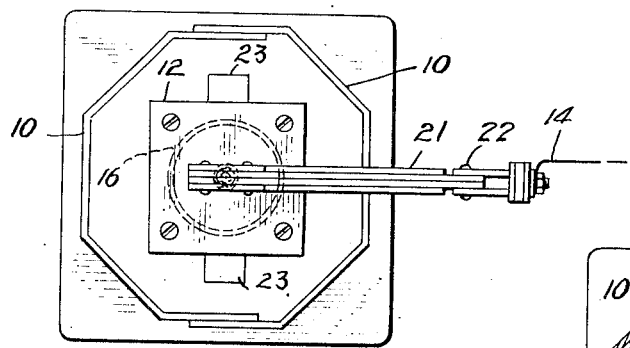
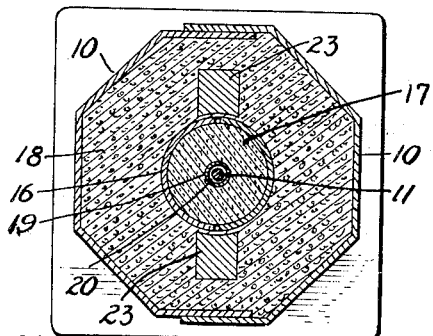
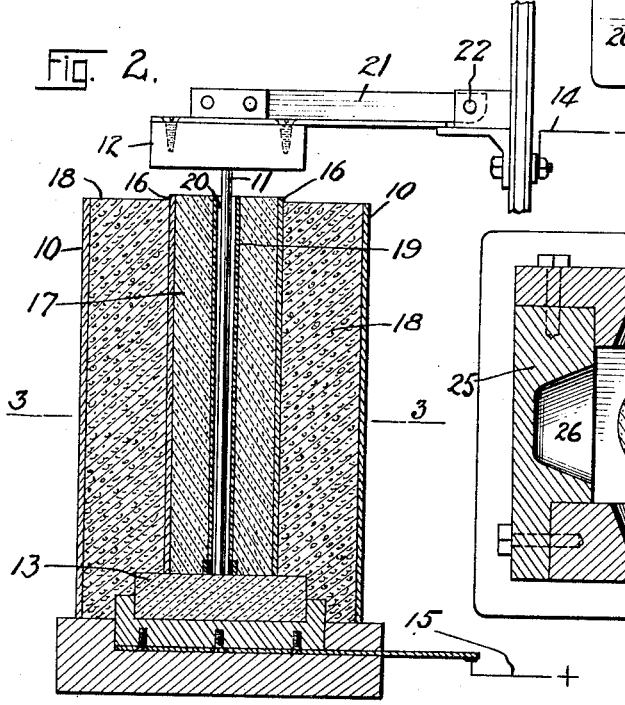
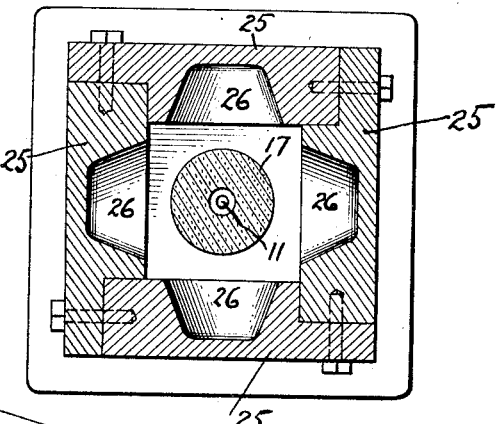
John Scharl
Inventor
By his Attorney J. SCHARL.
PROCESS FOR MAKING ARTICLES OF QUARTZ GLASS.
APPLICATION FILED FEB. 8, 1919.
1,375,657.
Patented Apr. 19, 1921.
2 SHEETS—SHEET 2.
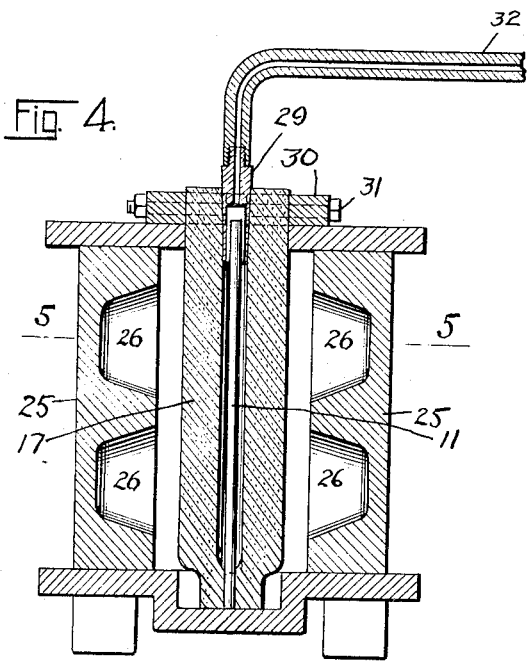
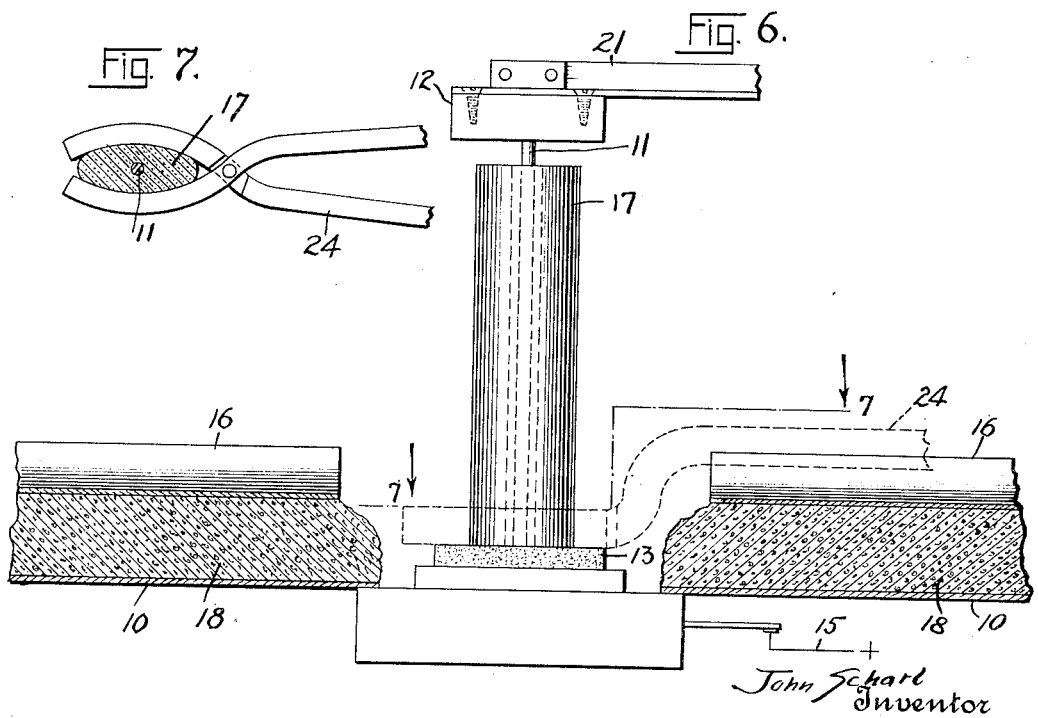

UNITED STATES PATENT OFFICE.

JOHN SCHARL, OF NEW YORK, N. Y., ASSIGNOR TO GENERAL CERAMICS COMPANY, OF JERSEY CITY, NEW JERSEY, A CORPORATION OF NEW JERSEY.

PROCESS FOR MAKING ARTICLES OF QUARTZ GLASS.

1,375,657.  Specification of Letters Patent.  Patented Apr. 19, 1921.

Application filed February 8, 1919. Serial No. 275,688.

*To all whom it may concern:*

Be it known that I, JOHN SCHARL, subject of Hungary, citizen of the United States, and resident of the city of New York, in the county of New York and State of New York, have invented certain new and useful Improvements in Processes for Making Articles of Quartz Glass, of which the following is a specification.

This invention relates to processes of producing articles of quartz glass and is directed particularly to improvements in the well-known process of reducing the quartz to plasticity in an electric resistance furnace with a resistance core and then blowing the plastic mass into molds.

This process requires very rapid handling of the plastic material and difficulty has been experienced in that the plastic cylinder of quartz formed in the furnace cools in being removed from the furnace to the mold and in the process of blowing the same out to the desired shape.

In one method of operation referred to in my copending application for patent Ser. No. 254,560, filed September 18th, 1918, the resistance core is first withdrawn and the fused mass with the tubular opening formed therein by the core, then removed to the mold. The cold air thus gets in through this opening and chills the mass from the inside while it is being chilled on the outside as well. In the mold, the chilling of the mass continues and especially in those processes where cold compressed air is used for blowing the plastic mass out into a desired shape.

In my present process, I keep the entire fused mass plastic much longer than has been possible with processes of like character heretofore used so that more time is afforded for operation in blowing the fused mass out into desired shapes, and greater accuracy of shape and higher grades of quartz glass articles may be produced. This I accomplish by removing the fused mass from the furnace together with the core into the mold, so that the core, still hot, may continue to heat the mass; by making use of the hot gases given off from the core to heat the mass without permitting them to diffuse therethrough; and by employing in the molding operation a hot gas under pressure, all as will hereinafter more fully appear.

My improved process will now be described with the aid of the accompanying drawing illustrating a preferred form of apparatus for the carrying out thereof, and in which—

Figure 1 is a plan view of an electric furnace adapted to carry out my improved process;

Fig. 2 is a sectional elevation of the electric furnace showing the quartz disposed around and the inclosed resistance core;

Fig. 3 is a section taken along line 3—3 of Fig. 2;

Fig. 4 is a sectional elevation of a mold showing the plastic mass positioned therein ready to be blown into the desired shape;

Fig. 5 is a section taken along line 5—5 of Fig. 4;

Fig. 6 is a view showing the mass of quartz fused after passage of the electric current and ready to be removed to the mold, the parts of the shell of the furnace having been made to fall apart, and the bottom of the fused mass having been pressed tight by a pair of tongs, and Fig. 7 is a section cut on line 7—7 of Fig. 6.

The quartz is fused in an electric resistance furnace consisting of a shell 10 and a resistance core 11 held between the electrodes 12 and 13. Current is supplied to the electrodes as by the leads 14 and 15. A two-part jacket 16 of heat resistant material, such as carbon or graphite is positioned in the shell and within this jacket is placed a fine grade of silica 17 from which the quartz articles are to be formed. Outside of this jacket, the shell is filled with heat insulating means, as for example coarse silica 18. Surrounding the resistance core 11 is the tube 19 of heat resistant material such as carbon or graphite forming a space therebetween and the core wherethrough the gas formed at the core may escape, the tube preventing said gas from diffusing into the fused mass of quartz.

In a preferred form of construction shown in Figs. 1 and 2, the resistance core is pressed down in position against the bottom electrode by the weight of the top electrode secured to the metal bar 21 which is pivoted as at 22 so that the top electrode may be swung upward out of the way when removing the fused mass.

Inasmuch as when the silica is fused it becomes somewhat conductive the current may pass through it and through the jacket and thus fuse some of the coarse silica on the outside of the jacket. This may cause difficulty in preventing the halves of the jacket from falling apart. I therefore provide vertical members 23 of refractory material such as carbon or graphite spaced a little from the jacket to prevent the coarse silica therebetween and the latter from fusing against it.

The carrying out of my process will now be readily understood. The jacket, 16 is positioned in the furnace and the core inserted in the tube 19 and the silica filled in around the tube. The current is then passed until the silica is fused into a plastic cylinder, the gas formed at the resistance core during the fusing operation escaping through the tubular space 20. The two parts of the shell 10 are then pulled apart and allowed to fall into the position shown in Fig. 6, the two halves of the jacket 16 falling apart at the same time, as shown. The mass is then closed at the bottom in any suitable manner, as by pressing it tight with the tongs 24. The top electrode is then swung upward and the fused mass withdrawn from the furnace together with the core into the mold 25 where it is blown out into articles of desired shape such as shown at 26. The hot core keeps the mass plastic while it is being removed and while in the mold, while the hot gases escaping upward through the tubular space 20 also help keep the mass hot, no cold air getting into the space 20 as the fused mass has already been closed at the bottom. In blowing the plastic quartz into molds, I employ a hot gas under pressure preferably steam. The handling of the plastic quartz in the mold must be very rapid and by the use of a preheated gas such as steam, I obtain the desired pressure and at the same time do not permit the plastic mass to harden too quickly. The blowing out process may be carried out as follows: The plastic mass closed at the bottom having been placed in the mold, an airtight joint may be procured at the top by pressing the top of the plastic mass against the nozzle 29 by means of the plates 30 and the bolts 31. This nozzle 29 is made preferably of highly heat resistant material, such as carbon or graphite and the steam injecting tube or blow-pipe 32 may be threaded or in any other suitable way connected thereto.

It will of course be understood that what makes it possible to blow the fused mass out in the mold with the core in position, is the tube 19 which is spaced from the core, thus, allowing the compressed gas to enter without removing the same. During the process, this tube 19 which is made very thin becomes fragile under the influence of the heat and as the blowing operation proceeds, it is blown into the mass and totally disappears, leaving no trace in the finished product.

I have described my newly improved process with reference to the making of small articles of glass such as shown at 26. It will be noted that as these are blown the dishes when finished have the closed bottom due to their being blown in the walls of the mold. In blowing the larger articles, as for example large crucibles, a vertical mold is used and in order to provide the bottom for the crucible, the fused mass, instead of being pressed tight at the bottom against the core may be forced beneath the core. In this way the fused mass is closed at the bottom and at the same time there is material completely covering the hot core so that in blowing a complete crucible may be had having no hole in the bottom.

Having thus described my invention, I claim as new and desire to secure by Letters Patent:

1. The process of making articles of quartz glass consisting in heating the quartz into a plastic mass in an electric resistance furnace about a resistance core, closing the bottom of the fused mass, then removing the same from the furnace together with the hot core and blowing the mass out into desired shape.

2. The process of making articles of quartz glass consisting in heating the quartz into a plastic mass in an electric resistance furnace about an inclosed resistance core, closing the bottom of the fused mass, then removing the same from the furnace together with the hot core and blowing the mass out into desired shape.

3. The process of making articles of quartz glass consisting in heating the quartz into a plastic mass in an electric resistance furnace about a resistance core, closing the bottom of the fused mass, removing the fused mass from the furnace together with the hot core, placing the same in a mold and pressing the open end thereof around a nozzle, then blowing a preheated gas under pressure therethrough substantially as described.

4. The process of making articles of quartz glass consisting in heating the quartz into a plastic mass in an electric resistance furnace about an inclosed resistance core, closing the bottom of the fused mass, removing the fused mass from the furnace together with the hot core, placing the same in a mold and pressing the open end thereof around a nozzle, then blowing a preheated gas under pressure therethrough substantially as described.

Signed at New York city in the county of New York and State of New York this 3rd day of February A. D. 1919.

JOHN SCHARL.